United States Patent [19]

Rosenzweig et al.

[11] Patent Number: 4,775,501
[45] Date of Patent: Oct. 4, 1988

[54] HEAT RECOVERABLE ARTICLE COMPRISING CONDUCTIVE POLYMER COMPOSITIONS

[75] Inventors: Nachum Rosenweig, Palo Alto, Pravin L. Soni, Union City; both of Calif.

[73] Assignee: Raychem Corp., Menlo Park, Calif.

[21] Appl. No.: 201,176

[22] Filed: Apr. 2, 1985

Related U.S. Application Data

[63] Continuation-in-part of Ser. No. 596,761, Apr. 4, 1984, abandoned.

[51] Int. Cl.$^4$ .............................................. B29C 61/02
[52] U.S. Cl. .................................... 264/27; 156/49; 156/86; 219/535; 264/36; 264/105; 264/154; 264/230; 264/249
[58] Field of Search ................. 264/230, 25–26, 264/27, 36, 249, 105, 176 R, 154; 156/49, 86; 219/535

[56] References Cited

U.S. PATENT DOCUMENTS

| | | | |
|---|---|---|---|
| 3,658,976 | 5/1972 | Slade | 264/105 |
| 3,953,059 | 4/1976 | Carroll | 264/249 |
| 4,055,615 | 10/1977 | Ikeda | 264/105 |
| 4,070,044 | 1/1978 | Carrow | 156/86 |
| 4,085,286 | 4/1978 | Horsma et al. | 174/92 |
| 4,151,126 | 4/1979 | Adelman et al. | 252/508 |
| 4,177,446 | 12/1979 | Diaz | 338/212 |
| 4,252,849 | 2/1981 | Nishimura et al. | 428/192 |
| 4,272,474 | 6/1981 | Crocker | 264/176 R |
| 4,304,616 | 12/1981 | Richardson | 264/230 |
| 4,362,684 | 12/1982 | Thalmann | 264/230 |
| 4,378,323 | 3/1983 | Brandeau | 264/105 |
| 4,419,156 | 12/1983 | Diaz et al. | 156/49 |
| 4,419,304 | 12/1983 | Ficke et al. | 264/25 |
| 4,421,582 | 12/1983 | Horsma et al. | 156/86 |
| 4,436,987 | 3/1984 | Thalmann et al. | 219/535 |
| 4,455,482 | 6/1984 | Grandclement | 264/27 |
| 4,467,002 | 8/1984 | Crofts | 264/230 |
| 4,518,552 | 5/1985 | Matsuo et al. | 264/126 |
| 4,586,970 | 5/1986 | Ishise et al. | 156/86 |
| 4,596,732 | 6/1986 | Diaz | 428/181 |

FOREIGN PATENT DOCUMENTS

| | | |
|---|---|---|
| 894109 | 2/1983 | Belgium . |
| 705309 | 3/1965 | Canada ............................. 264/230 |
| A0036963 | 5/1981 | European Pat. Off. . |
| 0042262 | 6/1981 | European Pat. Off. . |
| 2414077 | 10/1975 | Fed. Rep. of Germany ...... 264/230 |
| 2832119 | 2/1979 | Fed. Rep. of Germany . |
| 3107489A | 9/1982 | Fed. Rep. of Germany . |
| 56-95647 | 8/1981 | Japan ............................... 264/230 |
| 57-56226 | 4/1982 | Japan ............................... 264/25 |
| 58-81129 | 5/1983 | Japan ............................... 264/25 |
| 1449539 | 9/1965 | United Kingdom . |
| 1116878 | 6/1968 | United Kingdom . |
| 1265194 | 3/1972 | United Kingdom . |
| 2012149 | 7/1979 | United Kingdom . |
| 2076489 | 12/1981 | United Kingdom . |

Primary Examiner—Jeffery Thurlow
Attorney, Agent, or Firm—Timothy H. P. Richardson

[57] ABSTRACT

A method of joining, repairing or reinforcing substrates, particularly polymeric pipes for transporting fluids, e.g. natural gas and water. The method makes use of an article, preferably a heat-recoverable article, which comprises a conductive polymer composition and which is heated to its recovery temperature by passing electrical current through the conductive polymer. Preferably the article is a heat-shrinkable coupler. The coupler may make direct contact with and fuse to the pipes, or there may be an insert between the coupler and the pipes. The article preferably comprises carbon black dispersed in either a sintered polymer, particularly ultra high molecular weight polyethylene or a very high molecular weight polymer, particularly polyethylene having a molecular weight greater than 150,000.

36 Claims, 5 Drawing Sheets

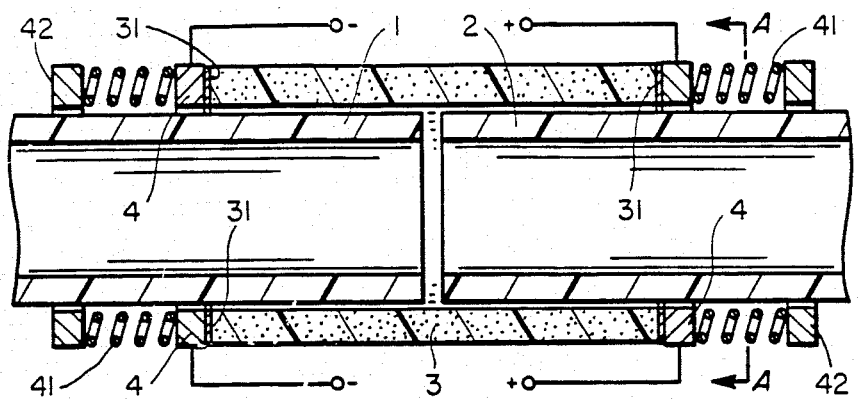
FIG_1
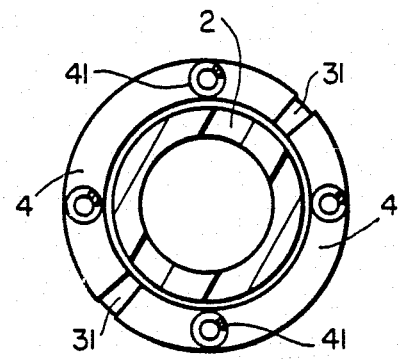
FIG_2
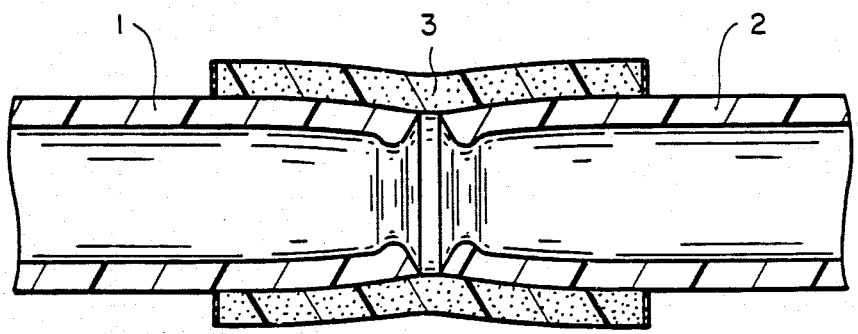
FIG_3

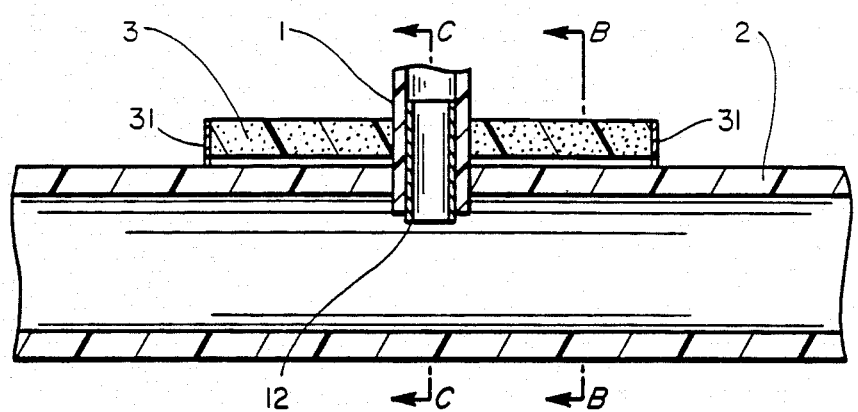
FIG_4
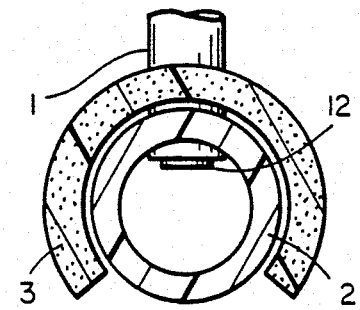
FIG_5
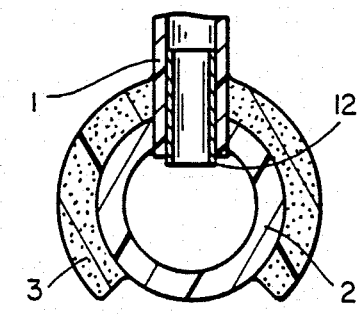
FIG_6

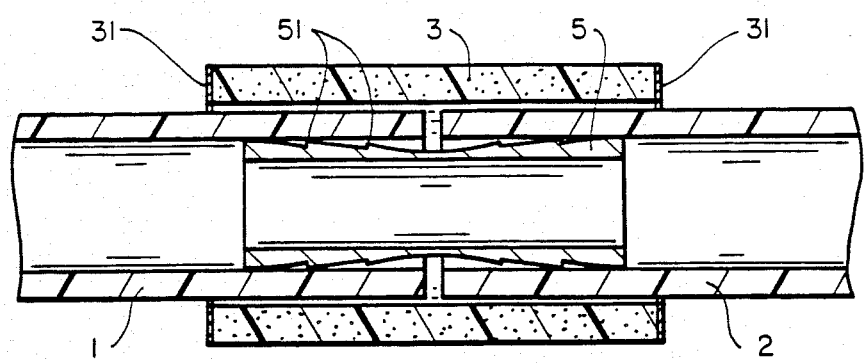
FIG_7
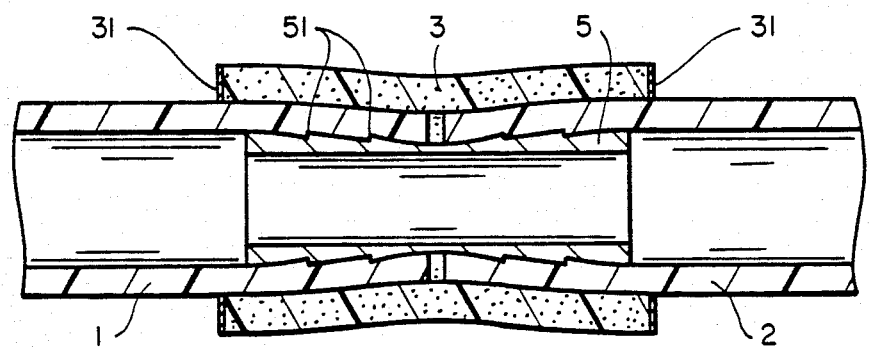
FIG_8
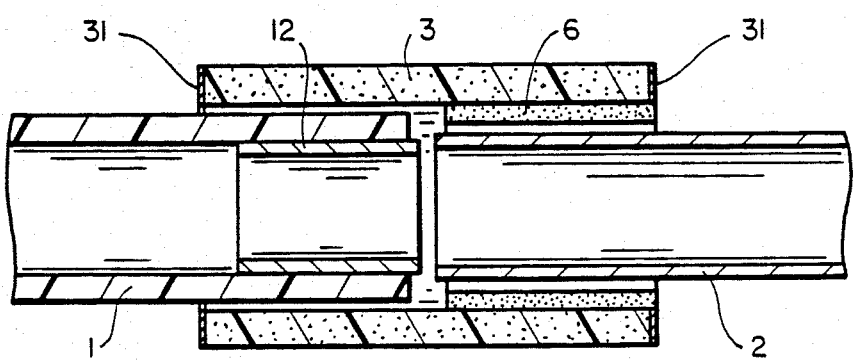
FIG_9

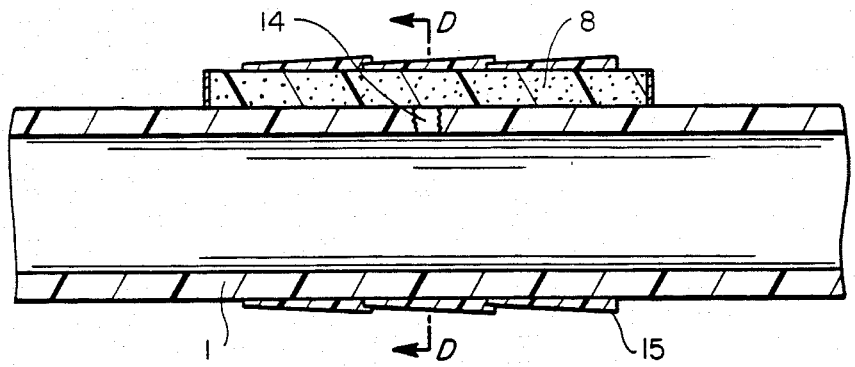
FIG_10
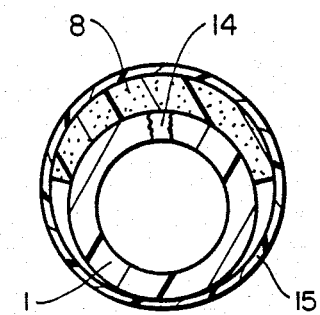
FIG_11
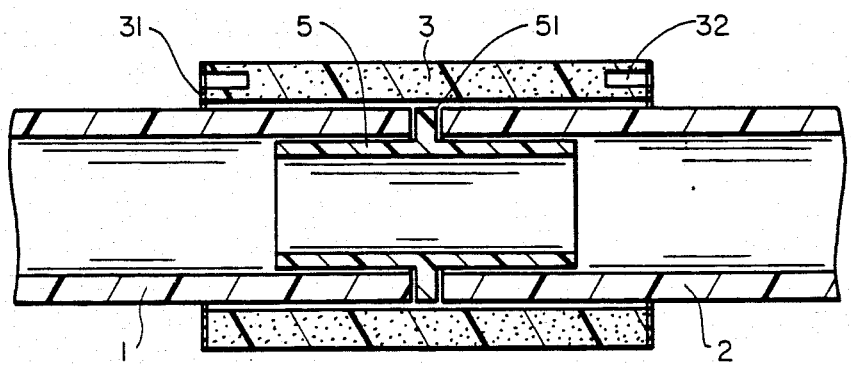
FIG_12

HEAT RECOVERABLE ARTICLE COMPRISING CONDUCTIVE POLYMER COMPOSITIONS

BACKGROUND OF THE INVENTION

This application is a continuation in part of Application Ser. No. 596,761, filed Apr. 4, 1984, now abandoned. The disclosure of which is incorporated herein by reference.

FIELD OF THE INVENTION

This invention relates to articles, particularly heat-recoverable articles, comprising conductive polymer compositions, and their use for joining, repairing, reinforcing or otherwise modifying substrates, particularly pipes composed of an organic polymer.

INTRODUCTION TO THE INVENTION

Many methods are known for joining, repairing and reinforcing pipes and other substrates, including methods which make use of heat-recoverable articles comprising conductive polymers, which, when powered, supply the heat needed to cause recovery of the article. Reference may be made for example to U.S. Pat. Nos. 4,085,286, 4,177,446, and 4,421,582, and U.K. Pat. No. 1,265,194, the disclosures of which are incorporated herein by reference. However, all the known methods suffer from one or more disadvantages, especially for joining pipes composed of organic polymers (often referred to as "plastic pipes"). This invention includes a new and advantageous method for joining plastic pipes and other substrates having at least an exterior surface composed of a polymeric composition. This method preferably makes use of a heat-shrinkable coupler which comprises a conductive polymer and which is heated to its shrinkage temperature by passing electrical current through the conductive polymer. Several conductive polymer compositions are suitable for the coupler of the present invention. One preferred coupler is composed of a sintered conductive polymer composition, and such a sintered composition is also very useful in other articles and methods which are novel to form part of the invention.

SUMMARY OF THE INVENTION

In its first aspect, the invention provides a method of joining, repairing, reinforcing and otherwise modifying, a substrate, at least an outer surface of which is composed of a first composition which is a heat-softenable composition comprising an organic polymer, which method comprises (1) placing adjacent to each other the parts of the substrates to be joined, repaired, reinforced or otherwise modified and an article comprising a heat-recoverable element, the heat-recoverable element being composed of a second composition which (a) is compatible with the first composition, and (b) comprises an organic polymer and, dispersed in the polymer, a particulate conductive filler; and (2) generating heat within said element, preferably by passing electrical current therethrough, to cause the element to recover into contact with the parts of the substrates to be joined, repaired, reinforced or otherwise modified and to cause fusion between the element and said outer surface.

The term "fusion", which is said to occur between the heat-recoverable element and the outer surface of a substrate, is used herein to mean that sufficient molecular compatibility exists between the element and the substrate outer surface that a bond forms which will provide mechanical performance equal to or greater than that of the substrate. This may be through viscoelastic contact as defined by J. N. Anand in Adhesion 1, 1969, pages 16 through 23 and Adhesion 2, 1970, pages 16 through 22, or through a process of molecular diffusion across the polymer/polymer interface, such that, within the interfacial region there is a continous concentration gradient of one polymer in the other.

In one preferred embodiment the article is composed of a sintered conductive polymer composition comprising a matrix consisting essentially of organic polymer particles which have been sintered together so that the particles have coalesced without losing their identity. Preferably the sintered conductive polymer composition comprises ultra high molecular weight polyethylene, having a molecular weight of at least 3 million. In another preferred embodiment the article is composed of a high molecular weight polymer having a molecular weight in the range 150,000 to 600,000, more preferably in the range 200,000 to 400,000. The high molecular weight polyethylene is melt-formed, rather than being sintered.

In its second aspect, the invention provides a heat-recoverable article comprising a heat-recoverable element which is composed of a sintered conductive composition comprising (a) a matrix consisting essentially of organic polymer particles which have been sintered together so that the particles have coalesced without losing their identity, and (b) a particulate conductive filler which is dispersed in said matrix but is present substantially only at or near the boundaries of the coalesced particles.

In its third aspect, the invention provides a method of joining, repairing, reinforcing or otherwise modifying a substrate, in which method an article comprising an element composed of a sintered conductive polymer composition as defined above, preferably a heat-recoverable article, is placed adjacent the substrate(s), and heat is then generated within the conductive polymer, preferably by passing current therethrough, to cause the article to adhere directly or indirectly to the substrate(s).

In its fourth aspect, the invention provides a method of joining at least two substrates positioned adjacent to each other such that there is a gap between the parts of the substrates to be joined, the method comprising:

1. selecting the substrates such that at least one of the substrates has at least an outer surface which is heat softenable, and/or providing an insert member which is composed of a heat softenable composition, 2. placing adjacent the substrates an article which comprises an organic polymer and dispersed in the polymer a particulate conductive filler, and 3. generating heat within the element (i) to cause the element to recover into contact with the parts of the substrate to be joined (ii) to cause the heat softenable composition(s) to soften and (iii) to drive the softened composition to fill the gap between the substrates.

In its fifth aspect the present invention provides a method of joining, repairing, reinforcing or otherwise modifying a hollow substrate comprising:

1. placing adjacent to the substrate an article comprising a heat-recoverable element comprising an organic polymer and dispersed in the polymer, a particulate conductive filler
2. positioning a support member within the hollow substrate, which support member has protuberances on its external surface, and
3. generating heat within said element to cause the element to recover towards the substrate such that it deforms the substrate into the gaps between the protruberances of the support member.

The invention also provides a modified substrate produced by the method according to the first, third or fifth aspect of the present invention, and a joint between at least two substrates provided by the method according to the fourth aspect of the present invention.

BRIEF DESCRIPTION OF THE DRAWING

The invention is illustrated in the accompanying drawings, in which the Figures are diagrammatic cross-sectional illustrations of the method and apparatus of the invention. In particular:

FIG. 1 shows an assembly for joining plastic pipes in-line by the method of the invention;

FIG. 2 is a cross-section on line B—B of FIG. 1;

FIG. 3 shows the finished joint prepared by the method illustrated in FIGS. 1 and 2;

FIGS. 4 and 5 show an assembly for joining plastic pipes so that one is branched off the other;

FIG. 6 shows the finished joint prepared by the method illustrated in FIGS. 4 and 5;

FIG. 7 shows an assembly for joining two plastic pipes in-line using a support member;

FIG. 8 shows the finished joint prepared from the assembly shown in FIG. 1;

FIG. 9 shows an assembly for joining a plastic pipe to a metal pipe;

FIG. 10 shows an assembly for joining pipes using a double layer coupler;

FIG. 11 shows an assembly for patching a hole in a pipe;

FIG. 12 shows the patched pipe prepared by the method of FIG. 11; and

DETAILED DESCRIPTION OF THE INVENTION

Figure 13:
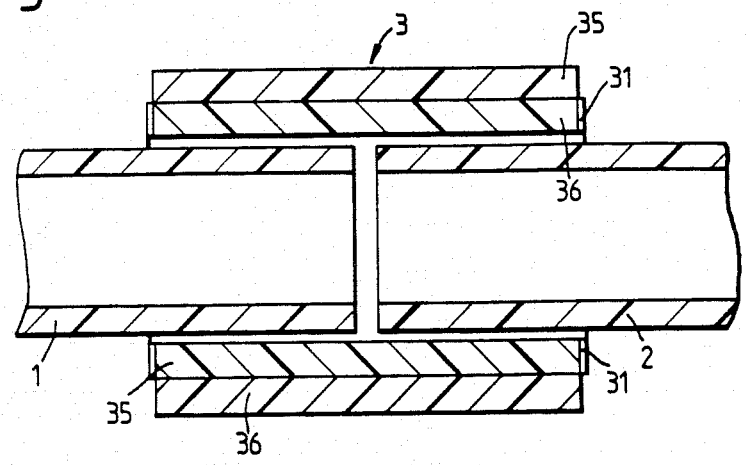
FIG. 13 shows another assembly for joining two plastic pipes in-line.

The methods of the invention can be used to join, repair, reinforce or otherwise modify any type of substrate, including pipes and cables, e.g. power cables, telecommunication cables and cables containing optical fibers. Particularly good results are obtained when the conductive polymer article is a heat-recoverable article and the substrate (or at least one of the substrates when two or more substrates are joined together) is composed of (or has at least an outer surface which is composed of) a heat-softenable composition comprising an organic polymer (referred to herein as "the first composition"). [The term "organic polymer" is used herein to denote any polymer which contains carbon in the backbone and/or in the side chains, including for example polymers of olefinic monomers, polyamides, polyesters, polyacrylates, polyimides, polycarbonates and polysiloxanes]. When using such articles and substrates, it is preferred to continue the heating of the recoverable article, after it has recovered into contact with the substrate(s), so that the surface of the substrate is heated and softened. This is particularly advantageous when the substrate surface and the recoverable article come into direct contact with each other and are composed of compositions which are compatible with each other, so that at least one of the heat-softened polymers can wet the other and thus cause fusion (as hereinbefore defined) of the compositions at the interface; for example, when using the preferred sintered conductive polymer composition, or the high molecular weight composition, there can be wetting and flow of a less viscous substrate composition around and possibly into the sintered article or coupler. To achieve such fusion, at least one and preferably both of the compositions should be above its softening point (in the case of crystalline polymers, above its crystalline melting point). The compatibility of different polymeric compositions depends upon a variety of factors, including both the chemical natures of the polymers and the other ingredients, e.g. fillers, of the compositions. However, those skilled in the art will have no difficulty, having regard to their own knowledge and the disclosure herein, in determining whether any two particular compositions are compatible. In many (but by no means all) cases, compatibility is the result of substantial amounts of common recurring units in the polymers of the two compositions, as for example when at least 10%, preferably at least 30%, of the recurring units in the polymeric component of the first composition are the same as at least 10%, preferably at least 30%, of the recurring units in the polymeric component of the second composition, these percentages being based on the number of recurring units.

When the two compositions are not compatible with each other and/or are not heated so that bonding can occur across the interface, and/or when the substrate (or at least one of the substrates if two or more substrates are used) is not composed of a heat-softenable polymeric composition (e.g. is composed of a metal, concrete, or a thermoset polymer), other steps may be desirable to achieve satisfactory results, depending upon the functional requirements of the end product. Such steps can for example include the use of an insert between the substrate and the article. The term "insert" is used herein in a broad sense to include any article, whether self-supporting or in the form of a layer supported on one of the surfaces, which will promote the strength of the attachment of the article to the substrate, or which will provide some other desirable result at the interface, e.g. electrical insulation. The insert can be effective as a result of its physical and/or chemical effect at the interface, and can be for an example an adhesive, including a hot-melt or heat-curable adhesive or a thermosetting resin such as an epoxy resin; a crosslinking agent or other chemical activator for one or both of the surfaces; or a metal, elastomeric or fibrous member including an O-ring or other sealing member which fits into a slot in a heat-recoverable article. Depending upon the nature of the insert, it may be desirable to continue to heat a recoverable article after it has recovered, in order to effect some desired change in one or more of the insert, the substrate and the article.

The insert may be provided as a lining on the inside surface of the heat-recoverable element, or it may be provided and installed separately, for example in the form of a tape which is wrapped around the substrates.

According to the fourth aspect of the present invention, heat is generated within the heat-recoverable element to cause heat softenable material either from a substrate, or from a separate insert member, or both to fill a gap between the substrates. Preferably a support member is also included adjacent the substrates, substantially to prevent the softened material flowing through rather than filling the gap between the substrates. The support member may also be provided with a stop to space the substrates to provide the gap therebetween. As examples of liners that may be used there may be mentioned (i) resins, especially thermosetting resins, for example epoxy resins which are preferably selected so as to cure on heating to form a good bond between the substrates, and (ii) heat activatable adhesives for example hot melt adhesives. The resin or adhesive is preferably reinforced by fibers or whiskers.

The method according to the fourth aspect of the present invention is particularly advantageous since it enables joints to be made between substrates that are incompatible with the article comprising the heat-recoverable element. Where the article is incompatible with the substrates to be joined or repaired it functions to drive the softened materials to fill the gap and to reinforce the formed joint. If reinforcing is not required, the article may be removed from the formed joint. The method is also advantageous, since by appropriate choice of material of the liner the properties of the joint region, for example the electrical continuity of the joint may be controlled. For example where the insulation at the ends of part of insulated electric cables has been bared to allow the cables to be electrically connected, the method may be used to join the cut back insulation. Electrical continuity or discontinuity of the joint can be achieved by appropriate selection of a conductive or non-conductive insert. For some applications an insert comprised of two materials, for example one conductive, one non-conductive, may be selected to achieve the desired properties at the joint region.

Where a liner is used in a method, preferable the fourth method, according to the present invention it is preferred to use for the heat-recoverable element (a) a composition which comprises (i) a matrix consisting essentially of particles of organic polymer, particles which have been sintered together so that the particles have coalesced without losing their identity, and (ii) a particulate conductive filler which is dispersed in said matrix but is present substantially only at or near the boundaries of the coalesced particles of polymer or (b) a high molecular weight polymer, which may or may not be cross-linked, having a molecular weight in the range 150,000 to 600,000, more preferably in the range 200,000 to 400,000. It is especially preferred to use ultra high molecular weight polyethylene. The advantage achieved with such materials is that they can withstand being heated to temperatures of 100° C. or more above their melting point for large periods up to several hours. This behaviour may be necessary where a liner of, for example, an epoxy resin having a long cure time is used. Another advantage of using sintered materials, or the cross-linked high molecular weight materials is that they exert high-recovery forces, of the order of several hundred psi radial pressure. The high-recovery forces are particularly advantageous in the method according to the fourth aspect of the invention since they ensure a good driving force to fill the gap between the substrates.

Where the surface of the pipes, or a liner, or both, flow to fill the gap between the substrates, the article is preferably arranged such that those portions of the pipe or liner adjacent the ends of the article do not soften, and therefore act as dams substantially to prevent egress of softened material out of the ends of the article. This may be achieved, for example, by shaping the article such that it has internal annular grooves at each of its ends.

The method according to the fourth aspect of the present invention can be used, for example, to couple glass reinforced plastic pipes.

The article may be any suitable shape depending on the nature of the substrates. In one embodiment the article is generally tubular, preferably cylindrical. Preferably the wall thickness of the article, whatever its shape, is at least 0.07 inch. The tubular article may be formed by a variety of methods, for example by moulding, extruding or sintering it directly into that shape, or by wrapping a number of overlapping layers of tape helically around a mandrel until the desired thickness of article is achieved, and then removing the mandrel. The wrapped tape may be heated before removal of the mandrel to fuse the layers of the tape together. The tape is preferable formed by extrusion.

When the substrate (or substrates) comprises a heat-softenable polymeric composition or another material whose functional properties can be adversely affected by excessive heating, care must be taken to limit the heat generated within the conductive polymer to an amount that does not have an adverse effect. Thus in the case of a pipe composed of heat-softenable polymeric material, heating should be discontinued before the pipe becomes distorted (as a result of pressure from the coupler or as a result of shrinkage of an oriented pipe) to an extent which has a substantial adverse effect; preferably the interior surface of the pipe remains substantially unchanged.

In one very useful embodiment of the invention, a coupler, preferably a heat-recoverable coupler, is used to join two or more pipes. The pipes can be the same or different in size and can be the same or different in composition. The ends of the pipes can be joined, or one or more pipes can be connected as branches to another pipe, usually or larger diameter. In one preferred method of the invention, two pipes, each composed of a heat-softenable organic polymer composition, preferably two identical pipes, are joined in-line, using a hollow, radially heat-shrinkable coupler.

In another preferred method, the end of a first pipe is joined as a branch into a second pipe, by a method comprising
1. making a hole in the wall of the second pipe;
2. placing the coupler adjacent the second pipe, the coupler (a) comprising a section which conforms generally to the wall of the second pipe and which has a hole therethrough and (b) being heat-recoverable in the area adjacent the hole so that when the coupler is heated the size of the hole decreases, and the hole in the coupler being aligned with the hole in the second pipe;
3. placing the end of the first pipe through the hole in the coupler; and
4. passing the electrical current through the conductive polymer element to cause the coupler to recover into contact with the first pipe.

In this method, preferably each of the first and second pipes is composed of a heat-softenable polymeric composition, and preferably the coupler becomes fused to both pipes. The end of the first pipe preferably passes through the hole in the wall of the second pipe, preferably as a snug fit. However, it is also possible for the hole in the wall of the second pipe to be smaller than the first pipe, the first pipe then being butted against the wall of the second pipe; the end of the first pipe can be shaped so that it fits snugly against the wall of the second pipe. In this method, the coupler comprises a section which initially conforms generally to the wall of the second pipe; this section need not initially fit closely to the wall, but it must do so before the method is complete. Preferably this result is achieved through use of a coupler in which the section adjacent the second pipe is at least part of a radially shrinkable cylinder and shrinks into contact with the second pipe. Such a coupler can for example be made by deformation of a split cylinder or by forming a sleeve around the second pipe by wrapping a recoverable sheet member around the pipe and securing the wrapped ends together. Alternatively or additionally the article can be secured to the second pipe by means of securing members, e.g. resilient straps, which will press the article against the second pipe while heat is generated within the conductive polymer, so that the article adheres to the second pipe.

According to the fifth aspect of the present invention, or according to the preferred embodiments according to the other aspects of the present invention, particularly when joining substrates, for example pipes, together, a hollow internal support member is used. The support member, for example, can function solely to maintain substantially the original internal dimensions of the pipes (e.g. when joining thin-walled plastic pipes which would otherwise be distorted by the coupler). Alternatively, the support member can increase the strength of the coupling by modifying the shape of the pipes, e.g. through the presence of circumferential ribs or other protruberances on the external surface of the support member or through use of a support member whose center section is of smaller size than its end sections. The use of such a support having external protruberances is particularly preferred for methods of joining, reinforcing, repairing or otherwise modifying substrates where the substrate comprises a polymer that does not fuse to the article for example cross-linked polyethylene. The support member can also provide an adhesive at the junction of the pipes and/or bond chemically to one or both of the pipes. The support member can also provide a stop against which the end(s) of the pipe(s) can be butted, or can help to align the pipes (or otherwise maintain them in a desired spatial relationship). The support member is preferably shorter than the coupler, so that if the joint is subsequently flexed, the bending forces are not concentrated at the ends of the support member. The support member can be secured to the article so as to provide one or more pockets into which the substrate(s) can be inserted.

The invention is particularly useful for joining two or more pipes, with at least one of the pipes being composed of a composition based on an organic polymer, in particular polyethylene, polypropylene, or polyvinyl chloride, for example polyethylene pipes used to distribute natural gas or water, e.g. irrigation pipes.

The articles used in the present invention comprise, and may consist essentially of, an element, preferably a heat-recoverable element, composed of a conductive polymer composition. Heat is generated within the conductive polymer composition, and this is preferably achieved by passing electrical current through the element. However, internal heat generation can also be achieved in other ways, e.g. by induction or microwave heating. Conductive polymer compositions are well known and comprise an organic polymer component and, dispersed in the organic polymer component, a particulate conductive filler. [The term "particulate" is used herein to include particles of any shape, including particles of high and low aspect ratios, e.g. spherical, plate-like and acicular.] The preferred particulate filler in the present invention is carbon black. The conductive polymers used in the present invention preferably have resistivities at 23° C. in the range of 0.5 to 100 ohm.cm, with particularly preferred values within this range being dependent on the composition of the conductive polymer, the dimensions of the article, the electrode placement and the power source. Where sintered conductive polymers are used the composition preferably have resistivities in the range 1.5 to 100 ohm.cm. Preferably these factors are selected so that a satisfactory result (e.g. recovery of the article and, where appropriate, fusion at the interface) is obtained in a relatively short time, e.g. within 10 minutes, preferably within 5 minutes. Suitable power sources include for example DC voltages of 6, 12, 24, or 48 volts, for which resistivities of 0.5 to 10 ohm.cm are usually preferred, as well as voltages or 36–40, 110–120 or 220–240 volts AC, for which higher resistivities, e.g. 50–100 ohm.cm, are appropriate. The preferred dimensions of the articles will of course depend on their intended use. For tubular articles, the ratio of the diameter of the article to the wall thickness is preferably less than 18:1, e.g. 2:1 to 12:1, after recovery. A relatively large wall thickness (prior to shrinkage) of at least 0.07 inch, preferably at least 0.1 inch, is often desirable in order to ensure adequate strength to resist mechanical stresses and internal pressures. It is also often desirable that the articles should continue to generate heat at a high rate even at their recovery temperature, for example to promote rapid softening of the outer surface of a plastic pipe without softening the inner surface of the pipe. For this reason, it is preferred that the composition should not exhibit PTC behavior at temperatures up to and slightly above (e.g. up to 50° C. above) the recovery temperature; a change in resistivity by a factor of less than 5, preferably less than 2, over the temperature range 23° C. to (TR+50)°C., where TR is the recovery temperature, is preferred.

Many conductive polymer composition are known, and most of them are prepared by a melt-mixing process. The filler loadings needed to produce the desired levels of resistivity in melt-mixed conductive polymer compositions typically result in relatively poor physical properties. For example expansion ratios of at least 1.2 and preferably at least 1.5, which are desirable in the present invention (in order to accomodate a range of dimensions for the substrates, including eccentricity of pipes) are typically difficult to achieve at high filler loadings. We have surprisingly found that when melt processed high molecular weight polyethylene is used, having a molecular weight in the range 150,000 to 600,000, the change in the physical properties that occur as the filler loading is increased is less than that which occurs for lower molecular weight polyethylene, and for example, expansion ratios of 1.5 may be achieved. This melt processed high molecular weight polyethylene is one preferred material for the conductive polymer composition of the present invention.

High molecular weight polyethylene can be prepared by dry blending or melt blending the polymer particles and the conductive filler. The quantity of conductive filler required to provide a given level of resistivity is more than for the ultrahigh molecular weight polyethylene. The high molecular weight polyethylene composition preferably contains less than 26 weight percent, preferably less than 24 weight percent, especially preferably 18–24 weight percent of carbon black or other conductive filler.

In another embodiment, in view of certain advantages which can be obtained, it is preferred to use, in the present invention, a sintered conductive polymer composition rather than a melt processed polymer. The sintered composition comprises, and preferably consists essentially of,
   a. a matrix consisting essentially of organic polymer particles which have been sintered together so that the particles have coalesced without completely losing their identity, and
   b. a particulate filler, preferably carbon black, which is dispersed in said matrix but which is present substantially only at or near the boundaries of the coalesced particles.

Such conductive polymers can be prepared by sintering a dry blend of the polymer particles and the conductive filler. A typical process involves compaction of the dry blend, sintering of the compacted blend at or above atmospheric pressure and at a temperature at which the polymer softens but does not flow excessively, followed by cooling under pressure. The quantity of conductive filler required to provide a given level of resistivity is much less than in a melt-blended product. Thus the preferred sintered compositions for use in this invention contain less than 9%, preferably less than 7%, particularly 2 to 6%, by volume of carbon black or other conductive filler. Care must be used in selecting the carbon black (or other filler) in order to achieve the desired level of resistivity at these loadings. I have obtained excellent results using Ketjenblack EC, available from Akzo Chemie.

The polymer used in the preferred melt-formed high molecular weight composition or in the sintered conductive polymer compositions is preferably one which maintains a relatively high viscosity at the melt-formed sintering temperature. Accordingly it is preferred to use a polymer which, at a temperature 50° C. above its softening point, has a Melt Flow Index of less than 0.3 g/10 min, particularly less than 0.1 g/10 min especially less than 0.05 g/10 min, at a loading of 5 kg, and a Melt Flow Index of less than 3.0 g/10 min, particularly less than 1.0 g/10 min, especially less than 0.1 g/10 min, at a loading of 15 kg. Similarly, the composition in the article preferably has a high load melt index (HLMI), measured by ASTM D1238 Condition F 190/21.6, of less than 30, particularly less than 25, especially less than 20. Particularly good results have been obtained using ultra high molecular weight polyethylene (UHMWPE) especially such polyethylene having a molecular weight greater than about 1.5 million, particularly greater than about 3.0 million. In this connection reference may be made to my application Ser. No. 582105 filed Feb. 21, 1984 (MPO907-US1), the disclosure of which is incorporated herein by reference. Another polymer which behaves similarly when sintered is polytetrafluoroethylene (PTFE). Other polymers which can be sintered, but which are less viscous under sintering conditions than is preferred, are polyphenylene sulfide (PPS) and polyimides.

Particularly good results have also been obtained using melt-processed high molecular weight polymers in particular high molecular weight polyethyene (HMWPE) especially such polyethylene have a molecular weight greater than about 150,000 particularly greater than about 200,000. In this connection reference may be made to my application Ser. No. 720,118 filed contemporaneously herewith (MP1039-US1), the disclosure of which is incorporated herein by reference.

In one embodiment, it is preferred to cross-link the composition of the heat-recoverable element before it is expanded to render it heat-recoverable. Cross-linking may be achieved, for example, by irradiating the compositions, for example with high energy electrons or gamma rays. Various comparative tests were carried out on cross-linked and uncross-linked samples of HMWPE to illustrate the change in properties as cross-linked. The results are set out in Table 1 below:

TABLE 1

| Tensile Strength | cross-linked | 44.1 N/mm$^2$ |
| --- | --- | --- |
|  | uncross-link | 31.8 N/mm$^2$ |
| 2% modulus | cross-linked | 1000 N/mm$^2$ |
|  | uncross-linked | 813 N/mm$^2$ |
| Ultimate elongation | cross-linked | 15% |
|  | uncross-linked | 7.8% |
| Water absorption after 14 days | less than | 0.1% |

| Notched Impact Strength | | | | |
| --- | --- | --- | --- | --- |
|  | 23° C. | | −40° C. | |
|  | $F_{max}$ | En. abs. | $F_{max}$ | En. abs. |
| Uncross-linked | | | | |
| After 2 hrs. at 120° C. | 169 N | 2,03 KJ/m$^2$ | | |
| After 30 days at 110° C. | 200 N | 2,28 KJ/m$^2$ | | |
| Cross-linked | | | | |
| After 2 hrs. at 120° C. | 233 N | 3,12 KJ/m$^2$ | 206 | 2,55 |
| After 30 days at 110° C. | 272 N | 3,24 KJ/m$^2$ | 241 | 1,98 |
| After 5 min. at 220° C. | 247 N | 3,64 KJ/m$^2$ | 257 | 2,99 |

As can be seen cross-linking improves all the physical properties of the material, in particular the toughness. Also where a cross-linked material is used it can be expanded above the melting point of the material, so that lower expansion forces are required than for a non cross-linked sample which must be expanded below its melting temperature. Also high recovery forces are achieved using cross-linked materials.

The heat-recoverable element is preferably of the same composition throughout, but can be composed of different conductive polymers in different sections. The heat-recoverable element can be part or all of the conductive polymer element. The heat-recoverable element is preferably the sole heat-recoverable part of the heat-recoverable article, but the article can also include a second heat-recoverable component which is not composed of a conductive polymer. The heat-recoverable article preferably comprises a radially shrinkable tube of cylindrical or other closed cross-section, or a part of such a tube, e.g. a split cylinder, but can be of another shape, in particular a sheet which is formed into a heat-shrinkable enclosure by wrapping it around the substrate(s) and securing the wrapped ends together, or two or more parts, eg. half-shells, which can be secured together around a substrate. The shaped and/or the resistivity of the element can be varied so as to provide a desired variation from place to place in the rate of heating and/or the recovery force and/or the residual stress exerted on the substrate.

The heat-recoverable element may comprise two or more layers. The layers may be made from the same material, but are preferably made from different materials. In a preferred embodiment one of the layers comprises an organic polymer and dispersed therein a particulate conductive filler, which layer is arranged to generate heat by the passage of current therethrough, and the other layer comprises a non conductive material selected according to the desired properties. The layer containing the conductive filler may be located within the non conductive polymeric layer, or vice versa. Where the filler loaded layer provides the inner layer of the heat recoverable element, heat to cause bonding to the underlying substrate need be provided only at the element/substrate interface. This advantageously reduces the amount of heat needed to recover the coupling. In this arrangement the outer non conductive layer may be selected from an appropriate material to act as as insulation layer, reducing the cooling effect of the environment. This further reduces the heat needed to recover the element, and also makes the quantity of heat required more independent of the ambient temperature. The outer layer may also, or instead, act as a support or reinforcing layer, for example, it may be made from a tougher material than the inner, filled, conductive layer, to improve the impact properties of the element. In the reverse arrangement, where the non conductive polymeric layer is located within the layer containing conductive filler, the inner non conductive layer is advantageously selected to be compatible with the underlying substrate so as to form a good bond thereto. The inner layer may, for example, comprise a non cross-linked polymer which will readily flow and fuse to the underlying substrate. For example in the case of coupling polyethylene pipes the inner layer may comprises non cross-linked polyethylene.

The double or multilayer heat recoverable element may be made by any suitable fabrication technique. For example the layer may be coextruded or comoulded and then the formed double or multi layer element preferably expanded as a whole. Where the element is made by tape wrapping, tapes of two or more different materials may be used. Preferably one tape comprises a conductive polymeric materials and the other tape comprises a non conductive material. In arrangements where the inner layer (which is the most expanded layer in a tubular construction) is a non conductive polymeric layer, it preferably comprises a unfilled polymeric material such that it can withstand high expansion ratios. With such an arrangement very high expansion ratios of the order of 1.5 can be achieved.

Where extrusion is used to make the heat recoverable element a variety of electroding arrangements may be used. For example an array of axially extending electrodes may be used and the conductive polymer extruded thereover. Alternatively annular electrodes may be positioned at the ends of the element.

In many cases, it is desirable or necessary, in order to obtain the desired degree of heat-recovery, that the conductive polymer should be cross-linked, preferably by irradiation, e.g. to a dose of 3 to 20 Mrads. When fusion between the conductive polymer and the substrate is desired, the degree of cross-linking should be selected to permit this. When using high molecular weight polyethylene or sintered UHMWPE conductive polymer compositions, however, cross-linking is often not essential.

Any appropriate electroding means can be used to ensure satisfactory current flow through the conductive polymer. Thus electrodes can be incorporated into the conductive polymer during its shaping or can be applied to the exterior surface of the shaped element, bearing in mind that the electrodes must be placed so that they do not need to change shape during recovery of the element or must accommodate to the changing shape of the element as it recovers. Excellent results have been obtained by painting electrodes onto the ends of a tubular element (using, for example, commercially available paints containing silver), and making use of spring-loaded electrical leads which maintain contact with the silver paint electrodes as the element recovers. It is also possible to have recesses in the conductive polymer element and to plug electrical connectors, attached to flexible leads, into these recesses, using painted electrodes to spread the current if desired or necessary. By appropriate electroding arrangements, current can be caused to flow from end to end of the article or through the thickness thereof.

One suitable electroding system is disclosed in U.S. Ser. No. 607,991 (MP939) to McMillis, now Pat. No. 4,570,618, the disclosure of which is incorporated herein by reference, wherein the electrodes are arranged to change their shape and size as the element recovers to maintain electrical integrity at the interface between the electrodes and the element.

The heat-recoverable element may comprise means for controlling optimum recovery conditions. Such means are disclosed, for example in U.S. Ser. No. 634,241, now U.S. Pat. No. 4,575,618, and U.S. Ser. No. 634,242 (MP949 and MP950), the disclosures of which are incorporated herein by reference.

The invention is illustrated in the accompanying drawing.

Referring now to FIG. 1 and FIG. 2, which is a cross-section on line A—A of FIG. 1, show in cross-section two plastic pipes, 1 and 2, which are to be joined in-line. The ends of the pipes are butted together in the center of a hollow, cylindrical, radially heat-shrinkable coupler 3 which is composed of a conductive polymer. Silver paint electrodes 31 (which are in fact much thinner than illustrated in this and other Figures) have been painted onto the annular ends of the coupler. Electrode plates 4 are connectable to a power supply and are urged against the electrodes 31 by means of compressed springs 41 which bear against fixed bearing plates 42. When the plates 4 are connected to the power supply, the coupler 3 heats up to its shrinkage and then shrinks radially until it contacts the pipes. There is some axial shrinkage at the same time, but the springs 41 maintain the plates 4 in contact with the electrodes 31. If, as is preferred, the conductive polymer and the pipe material are compatible with each other, heating is preferably continued until the pipes have fused to the coupler.

FIG. 3 is a cross-section through a pipe joint produced by the method illustrated in FIGS. 1 and 2. The heating has caused fusion of the coupler to the pipes, but has also resulted in some distortion at the ends of the pipes, caused not only by softening but also by shrinkage of the pipes. The extent of distortion shown in FIG. 3 is more than is desirable, but the joint is nonetheless completely serviceable.

FIG. 4 and FIG. 5, which is a cross-section on line B—B of FIG. 4, show in cross-section two plastic pipes 1 and 2 which are to be joined at right angles so that the pipe 1 is a branch-off from pipe 2. A hole having the same diameter as the outside of pipe 1 is drilled in the wall of pipe 2. A coupler 3 is composed of a conductive polymer and is in the form of a radially shrinkable split cylinder which can be fitted over the second pipe. In the middle of the coupler is a hole which is of the same diameter as the hole in the second pipe and which has been formed by cutting a smaller hole in the coupler and expanding it to the desired diameter, so that the area of the coupler around the hole is heat-recoverable to the smaller size. The coupler 3 is fitted over the pipe 2 with the holes aligned. A metal support member 12 is placed in the end of pipe 1, which is then fitted through the holes in the coupler and the pipe 2, making a snug fit. Current is passed through the coupler, via silver paint electrodes 31 at its end, so that the coupler shrinks radially into contact with the pipe 1 and towards the center of the hole into contact with the pipe 2. The resulting joint is shown in FIG. 6, which is a cross-section on line C—C of FIG. 4 after the coupler has been recovered. The method illustrated in FIG. 4 and FIG. 5 can also be used with a coupler which is only heat-recoverable around the hole, providing that some means is adopted to keep the coupler in contact with the pipe 2 while it is heated and bonds to the pipe 2.

FIG. 7 is similar to FIG. 1 but illustrates the use of a tubular support member 5 which has a smaller external diameter at its center than at its ends and which comprises external circumferential ribs 51. The support member supports and engages the pipes during the coupling process, resulting in a joint as shown in FIG. 8.

FIG. 9 is also similar to FIG. 1 but shows the use of the invention to join a plastic pipe 1 to a metal pipe 2 of a different diameter, the coupler including an insert in the form of a layer of hot melt adhesive 6 which bonds the coupler to the metal pipe 2. Also, a support member 12 supports the plastic pipe.

FIG. 10 is similar to FIG. 1 but shows the use of a coextruded double layer heat recoverable coupler 3 to join two plastic pipes 1 and 2. The coupler 3 comprises an outer layer 35 of non conductive, unfilled high molecular weight polyethylene, and an inner layer 36 of a melt formed conductive polymer comprising high molecular weight polyethylene loaded with carbon black. Silver paint electrodes 31 are painted on the annular ends of the conductive layer 36. By passage of current through layer 36, heat is generated substantially only at the bond line between the coupler 3 and the pipes 1 and 2 thereby minimizing the heat needed to effect recovery. Layer 35 is not heated, and serves as a reinforcement and insulation layer.

FIG. 11 shows the repair of a plastic pipe 1 using a patch 8 which is not heat-recoverable and which is composed of a sintered conductive polymer composition which is compatible with the pipe material. Plastic pipe 1 has a hole 14 therein which needs to be repaired. The patch is placed over the hole and is kept in place by means of tape 15 which is wrapped around the patch and the tape. Current is passed through the patch so that it softens and fuses to the pipe, resulting in the product shown in FIG. 12, which is a cross-section on line D—D of FIG. 11.

FIG. 13 is similar to FIG. 7, but illustrates the use of another tubular support member 5 which has a central stop 51 against which the ends of the pipes are butted. The stop 51 could be composed of a hot melt adhesive to promote adhesion between the pipe ends, and/or could be secured to the coupler 3 to provide a unitary article having pockets into which the pipes are fitted. Also shown in FIG. 13 are recesses 32 into which electrical connectors can be fitted.

Figure 14:
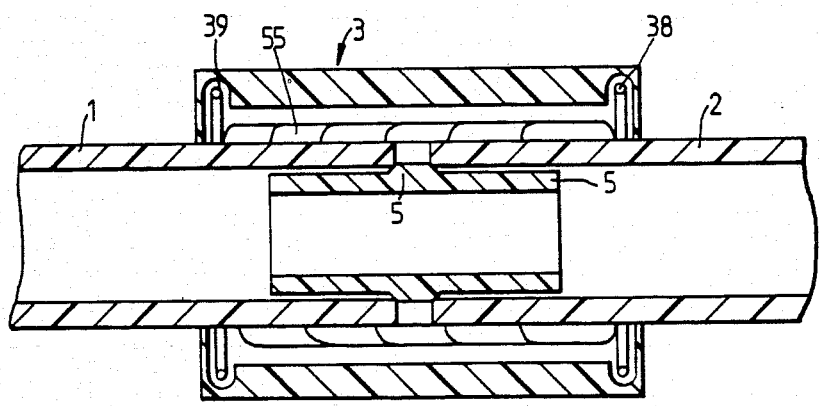
FIG. 14 shows another assembly for joining pipes in line including an insert between the pipe and the heat-recoverable element.

FIG. 14 is similar to FIGS. 7 and 13 using a tubular support 5 which has a central stop 51 against which the ends of the pipe are butted. The stop 51 spaces the pipes 1 and 2 so that there is a space therebetween. The pipes 1 and 2 to be joined comprise glass reinforced plastic, the surface of which softens when heated, and the coupler 3 comprises ultra high molecular weight polyethylene. An epoxy adhesive glass filament reinforced tape 55 is wrapped around the joint several times. The coupler 3 comprises annular recesses 38 at its ends in which annular wire electrodes 39 reside. The grooves 38 are coated with silver paint (not shown). Current is passed via electrode 39 through the coupler 3 causing the coupler to recover into contact with the tape 55 and also causing both epoxy tape 55 and the surface of pipes 1 and 2 to soften. The recovering driver forces the softened material to fill the gap between the pipes 1 and 2, where the epoxy cures to form a bond between the pipes. Thus butt fusion of the pipe ends results. Since part of the tape 55 and the surface of the pipes 1 and 2 adjacent recesses 38 of the coupler are heated less than those parts adjacent the body of the coupler they do not soften and hence they substantially prevent egress of the softened material out of the ends of coupler 3.

The invention is illustrated by the following three Examples. All three examples use a polyethylene coupler to couple together two pipes. UHMWPE is used in examples 1 and 3. HMWPE is used in example 2. In examples 1 and 2 the coupler is compatible with the pipes, while in Example 2 the coupler is incompatible with the pipes and a curable epoxy insert is used between the coupler and the pipes.

EXAMPLE 1

UHMWPE powder (Hostalen GUR-413, available from 5 American Hoechst), 95 parts by volume, having a molecular weight of about 4.0 million and an average particle size of about 0.1 mm, and carbon black (Ketjen Black EC, available from Akzo Chemie), 5 parts by volume, were thoroughly mixed together in a high speed blender. The mixture was used to fill a cylindrical mold having an annular cross-section (inner diameter 0.8 inch, outer diameter 1.2 inch). The mixture was compacted in the mold at room temperature for about 5 minutes, using a pressure of about 15,000 psi, and was then sintered in the mold at about 230° C. for about 60 minutes, using a very low pressure (2 psi or less). When sintering was complete, the sintered mixture was cooled in the mold to about 50° C., while maintaining it under a pressure of about 12,000 psi. The mold was then opened and the sintered product removed. The product was about 2 inch long.

The sintered product was cross-linked by irradiating it to a dosage of about 3 Mrad, and was then rendered heat-shrinkable by expanding it at 120° C. to an inner diameter of about 1.2 inch, using a conical mandrel. Silver paint electrodes were painted onto the annular ends of the expanded product. The resistance of the product between the electrodes was about 5 ohms, the conductive polymer having a resistivity of about 3.8 ohm.cm.

The sintered product was used to couple together two polyethylene pipes having an outer diameter of about 0.84 inch and a wall thickness of about 0.11 inch. The ends of the pipes were placed within the coupler, the pipe ends being butted together at the center of the coupler. The silver paint electrodes were connected to a 24 volt AC power supply by means of metal plates which were spring-loaded in the axial direction. The coupler heated up and when it reached its shrinkage temperature (after about 30–45 seconds) it shrank into contact with the pipes. The spring-loaded metal plates maintained electrical contact with the coupler as it shrank. Current was passed through the coupler for another minute, and this resulted in fusion of the pipes to the coupler.

After cooling, the joint was tested by maintaining it at an internal pressure of about 120 psi and a temperature of about 80° C.; there was no leakage from the joint after 500 hours, when the test was discontinued. A pull-out test was conducted at room temperature, and was terminated when yielding of the pipes occurred, at which time the joint remained sound.

EXAMPLE 2

HMWPE pellets (Marlex HDM 50100 available from Phillips Chemical Co.), 74 weight %, having a molecular weight of about 200–300,000, and carbon black (Ketjenblack, EC, available from AKZO Chemie), 25 weight percent, were thoroughly mixed together using conventional compounding, e.g. using a Banbury, two roll mill and pelletizing extruder. The compound was continuously extruded to an annular cross-section (inner diameter 0.89 inch, outer diameter 1.2 inch).

The extruded product was then rendered heat shrinkable by expanding it at 120° C. to an inner diameter of about 1.2 inch, using a conical mandrel. Silver paint electrodes were painted on to the annular ends of the expanded product. The resistivity of the conductive polymer was about 0.5 to 1.0 ohm.cm.

The extruded HMWPE product was used to couple two polyethylene pipes identical to those coupled by the UHMWPE coupler. The arrangement was identical to that used for the UHMWPE coupler except that the electrodes were connected to the power supply by means of metal plates which were loaded in the axial direction by means of elastic bands. The coupled joint was tested in the same way as the UHMWPE coupled joint. As with the UHMWPE coupled joint, there was no leakage after 500 hours and the joint remained sound after a pull out test.

EXAMPLE 3

A dry blend of UHMWPE (identical to that used in Example 1), 93 parts by volume, and carbon black (identical to that used in Example 1), 7 parts by volume, was ram extruded to form a cylindrical product (inner diameter 1.8 inches, outer diameter 2.4 inches, length 4 inches). Annular grooves were milled around each end of the cylinder from the inside.

The ram extruded product was cross-linked by irradiating it to a dosage of about 6 MRADS by exposing it to a cobalt source. Then the product was rendered heat shrinkable by expanding it at 130° C. to an inner diameter of 2.5 inch. After cooling, silver paint was painted into the grooves and wire electrodes inserted into the grooves.

The UHMWPE coupler was to be used to couple two glass filament wound epoxy pipes (outer diameter 1.9 inch, thickness 0.1 inch). The outer surface of the pipes was prepared by abrading them with fine abrasive paper. The pipes were aligned end to end and then all epoxy adhesive glass filament tape (thickness 0.0075 inch), made by 3M, was wound around the joint to extend approximately 1.8 inches along each pipe on either side of the joint. About eight layers of tape were applied.

The UHMWPE coupler was positioned over the tape and the wire electrodes connected to a 24 volt DC power supply. The coupler heated up and when it reached its shrinkage temperature (about 4 minutes) shrunk to grip the epoxy tape. Current from the 24 volt supply was supplied for a further 10 minutes to heat the coupler to approximately 200° C. Then the voltage was decreased to 10 volts and current supplied for a further 70 minutes to maintain the temperature between 200° C. and 210° C. Finally the temperature was raised to 230° C. and maintained at this temperature for a further 10 minutes. After cooling the tape was cured.

The joint was tested in the identical manner to Examples 1 and 2. There was no leakage and the joint remained sound.

I claim:

1. A method of joining, repairing, reinforcing or otherwise modifying a substrate having at least one outer surface which is composed of a first composition which is a heat-softenable composition comprising an organic polymer, which method comprises
    1. placing adjacent to the substrate an article comprising a heat-recoverable element, the heat-recoverable element being at least 0.1 inch thick, having a recovery temperature TR, and being composed of a second composition which (a) is compatible with the first composition; (b) comprises (i) a matrix consisting essentially of organic polymer particles which have been sintered together so that the particles have coalesced without completely losing their identity, and (ii) a particulate conductive filler which is dispersed in said matrix but is present substantially only at or near the boundaries of the coalesced particles; and (c) increases in resistivity by a factor of less than 5 over the temperature range 23° C. to (TR+50)° C.;
    2. generating heat within said element by passing electrical current therethrough, thus causing the element to recover into direct physical contact with the outer surface of the substrate; and
    3. continuing to generate heat within said element by passing electrical current therethrough after it has recovered into contact with the substrate, so as to cause fusion (as hereinbefore defined) between the element and said outer surface.

2. A method according to claim 1 wherein the substrate is a pipe.

3. A method according to claim 2 which comprises joining together two substantially identical pipes which are in-line and each of which consists essentially of the first composition; and said article is a hollow, radially heat-shrinkable coupler.

4. A method according to claim 1 wherein the organic polymer is a ultrahigh molecular weight polyethylene having a molecular weight greater than 1.5 million.

5. A method according to claim 4 wherein the second composition has a resistivity at 23° C. of 1 to 100 ohm.cm and contains less than 9% by volume of a particulate conductive filler.

6. A method according to claim 1 wherein the second composition has a high load melt index, measured by ASTM D1238 Condition F 190/21.6, of less than 25.

7. A method according to claim 1, wherein the heat recoverable element comprises two or more layers of different materials.

8. A method according to claim 7, wherein one layer comprises organic polymer and dispersed in the polymer a particulate conductive filler, and another layer comprises a non conductive layer.

9. A method according to claim 1 wherein the second composition
(a) has a resistivity at 23° C. for 1 to 100 ohm.cm, and
(b) comprises
(i) a matrix consisting essentially of particles of ultra high molecular weight polyethylene which have been sintered together so that the particles have coalesced without losing their identity, and
(ii) less than 9% by volume of a particulate conductive filler which is dispersed in said matrix but is present substantially only at or near the boundaries of the coalesced particles of polyethylene.

10. A method according to claim 9 wherein the polyethylene has a molecular weight greater than 4.0 million.

11. A method according to claim 9 wherein the conductive polymer composition contains 2 to 6% by volume of carbon black.

12. A method according to claim 2 wherein the end of a first pipe is joined as a branch into a second pipe, which method comprises
1. making a hole in the wall of the second pipe;
2. placing the article adjacent the second pipe, the article (a) comprising a section which conforms generally to the wall of the second pipe and which has a hole therethrough and (b) being heat-recoverable in the area adjacent the hole so that when the article is heated the size of the hole decreases, and the hole in the article being aligned with the hole in the second pipe;
3. placing the end of the first pipe through the hole in the article; and
4. passing electrical current through the conductive polymer element to cause the article to recover into contact with the first pipe.

13. A method according to claim 12 wherein the end of the first pipe passes through the hole in the wall of the second pipe; the first pipe and the second pipe are composed of a said first composition; and the article becomes fused to both the first pipe and the second pipe.

14. A method according to claim 2 which comprises placing a hollow support member within at least one of the pipes before recovering the article.

15. A method according to claim 1 wherein said article consists essentially of the heat-recoverable element and electrodes secured thereto.

16. A method according to claim 15 wherein the heat-recoverable element is a cylindrical radially heat-shrinkable article and the electrodes are annular electrodes positioned at the ends of the heat-recoverable element.

17. A method according to claim 1 wherein the conductive polymer increases in resistivity by a factor of less than 2 over the temperature range 23° C. to (TR+50)°C., where TR is the recovery temperature.

18. A method according to claim 1 wherein the first composition comprises a polymeric component in which at least 30% of the recurring units are the same as at least 30% of the recurring units in the polymeric component of the second composition.

19. A method of joining the ends of two polyethylene pipes, which method comprises
1. placing the ends of the pipes, with the pipes in line, within a coupler which consists essentially of
a. a hollow radially heat-shrinkable element which has a wall thickness of at least 0.1 inch and which is composed of a conductive polymer composition which
i. has a resistivity of 0.5 to 100 ohm.cm at 23° C.,
ii. increases in resistivity by a factor of less than 5 over the temperature range 23° C. to (TR+50)°C., where TR is the recovery temperature, and
iii. comprises polyethylene and a particulate conductive filler dispersed therein; and
b. annular electrodes positioned at the ends of the heat-shrinkable element; and
2. passing current through the element, thus heating the element so that it shrinks into direct physical contact with the pipes and becomes fused to the pipes.

20. A method according to claim 19 wherein the conductive polymer composition consists essentially of (a) a matrix consisting essentially of particles of ultra high molecular weight polyethylene which have been sintered together so that the particles have coalesced without losing their identity, and (b) a particulate conductive filler which is dispersed in said matrix but is present substantially only at or near boundaries of the coalesced particles.

21. A method according to claim 20 wherein the conductive filler is carbon black and is present in amount 2 to 6% by volume of the composition.

22. A method according to claim 19 wherein the coupler has been prepared by melt-shaping a conductive polymer composition which consists essentially of polyethylene having a molecular weight greater than about 200,000 and a particulate conductive filler dispersed therein.

23. A method according to claim 22 wherein the conductive filler is carbon black and is present in amount less than 24% by weight of the composition.

24. A method of joining, repairing, reinforcing or otherwise modifying a substrate having at least an outer surface which is composed of a first composition which is a heat-softenable composition comprising an organic polymer, which method comprises
1. placing adjacent to the substrate an article comprising a melt-shaped heat-recoverable element, the heat-recoverable element being at least 0.1 inch thick, having a recovery temperature TR, and being composed of a second composition which (a) is compatible with the first composition, (b) comprises (i) an organic polymer having a molecular weight of at least 150,000 and (ii), dispersed in the polymer, a particulate conductive filler; and (c) increases in resistivity by a factor of less than 5 over the temperature range 23° C. to (TR+50)°C.;
2. generating heat within said element by passing electrical current therethrough, thus causing the element to recover into direct physical contact with the outer surface of the substrate; and
3. continuing to generate heat within said element by passing electrical current therethrough after it has recovered into contact with the substrate, so as to cause fusion (as hereinbefore defined) between the element and said outer surface.

25. A method according to claim 24 wherein the substrate is a pipe.

26. A method according to claim 25 which comprises joining together two substantially identical pipes which are in line and each of which consists essentially of the first composition, and said article is a hollow, radially heat-shrinkable coupler.

27. A method according to claim 26 which comprises placing a hollow support member within at least one of the pipes before recovering the article.

28. A method according to claim 24 wherein the second composition has a resistivity at 23° C. of 1 to 100 ohm.cm and contains less than 26% by weight of a particulate conductive filler.

29. A method according to claim 24 wherein the second composition increases in resistivity by a factor of less than 2 over the temperature range 23° C. to $(T_R+50)°C$.

30. A method according to claim 24 wherein the second composition has a high load melt index, measured by ASTM D1238 Condition F 190/21.6, of less than 25.

31. A method according to claim 30 wherein the second composition has a high load melt index of less than 20.

32. A method according to claim 24 wherein the second composition has been cross-linked.

33. A method according to claim 24 wherein the organic polymer in the second composition is polyethylene having a molecular weight of at least 200,000.

34. A method according to claim 24 wherein said article consists essentially of the heat-recoverable element and electrodes secured thereto.

35. A method according to claim 34 wherein the heat-recoverable element is a cylindrical radially heat-shrinkable article and the electrodes are annular electrodes positioned at the ends of the heat-recoverable element.

36. A method according to claim 24 wherein the first composition comprises a polymeric component in which at least 30% of the recurring units are the same as at least 30% of the recurring units in the polymeric component of the second composition.

* * * * *

UNITED STATES PATENT AND TRADEMARK OFFICE
CERTIFICATE OF CORRECTION

PATENT NO. : 4,775,501

DATED : October 4, 1988

INVENTOR(S): Nachum Rosenzweig et al

It is certified that error appears in the above-identified patent and that said Letters Patent is hereby corrected as shown below:

On the Title page, left hand column, "Inventors", replace "Rosenweig" by --Rosenzweig--.

On the Title page, left hand column, "Appl. No.:", replace "201,176" by --720,117--.

In Column 3, line 35, replace "FIG. 1" by --FIG. 7--.

In Column 6, line 45, replace "or larger" by --of larger--.

In Column 14, line 32, replace "Example 2" by --Example 3--.

In Claim 9, line 3, replace "23°C for 1" by --23°C of 1--.

Signed and Sealed this

Thirty-first Day of July, 1990

Attest:

HARRY F. MANBECK, JR.

Attesting Officer

Commissioner of Patents and Trademarks